(12) United States Patent
Raymond

(10) Patent No.: US 6,601,273 B1
(45) Date of Patent: Aug. 5, 2003

(54) LINE SECURING ASSEMBLY

(76) Inventor: Paul S. Raymond, 23 Pennacook St., Manchester, NH (US) 03104

( * ) Notice: Subject to any disclaimer, the term of this patent is extended or adjusted under 35 U.S.C. 154(b) by 0 days.

(21) Appl. No.: 10/056,444

(22) Filed: Jan. 25, 2002

(51) Int. Cl.$^7$ .............................................. F16G 11/00
(52) U.S. Cl. ....................... 24/129 R; 24/129 B; 24/130
(58) Field of Search ............................ 24/129 R, 129 B, 24/129 A, 130, 18; 114/218

(56) References Cited

U.S. PATENT DOCUMENTS

| | | | | |
|---|---|---|---|---|
| 278,097 A | * | 5/1883 | Collins | 24/129 B |
| 551,032 A | * | 12/1895 | Hemphill | 24/129 R |
| 757,820 A | * | 4/1904 | Lykke | 24/129 R |
| 986,014 A | * | 3/1911 | Krenzke | 24/129 R |
| 1,083,958 A | * | 1/1914 | Tod | 24/129 B |
| 1,205,496 A | * | 11/1916 | Whitehead | 24/130 |
| 1,782,625 A | * | 11/1930 | Neuberger | 24/129 R |
| 2,884,674 A | * | 5/1959 | Neuberger | 24/129 B |
| 3,713,680 A | | 1/1973 | Pagano | |
| 3,714,923 A | * | 2/1973 | Mariani | 24/129 B |
| 4,014,570 A | | 3/1977 | Ruggles et al. | |
| 4,034,443 A | | 7/1977 | Turner | |
| 4,572,555 A | | 2/1986 | Henderson | |
| 4,918,785 A | | 4/1990 | Spinner et al. | |
| 4,939,820 A | * | 7/1990 | Babcock | 24/129 R |
| D372,663 S | | 8/1996 | Dreger et al. | |

* cited by examiner

Primary Examiner—Victor Sakran

(57) ABSTRACT

A line securing assembly for assisting a lone user in securely and rapidly tying lines. The line securing assembly includes a main block member which is preferably substantially rectangular and provides a fixable point for securing a line, and a plurality of notch portions positioned along an outer edge of the main block member, each of the notch portions being for receiving a line to be secured.

8 Claims, 2 Drawing Sheets

LINE SECURING ASSEMBLY

BACKGROUND OF THE INVENTION

1. Field of the Invention

The present invention relates to knot tying devices and more particularly pertains to a new line securing assembly for assisting a lone user in securely and rapidly tying lines.

2. Description of the Prior Art

The use of knot tying devices is known in the prior art. More specifically, knot tying devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,034,443; U.S. Pat. No. 4,014,570; U.S. Pat. No. 4,918,785; U.S. Pat. No. 3,713,680; U.S. Pat. No. 4,572,555; and U.S. Pat. No. Des. 372,663.

While these devices fulfill their respective, particular objectives and requirements, the aforementioned patents do not disclose a new line securing assembly. The inventive device includes a main block member which is preferably substantially rectangular and provides a fixable point for securing a line, and a plurality of notch portions positioned along an outer edge of the main block member, each of the notch portions being for receiving a line to be secured.

In these respects, the line securing assembly according to the present invention substantially departs from the conventional concepts and designs of the prior art, and in so doing provides an apparatus primarily developed for the purpose of assisting a lone user in securely and rapidly tying lines.

SUMMARY OF THE INVENTION

In view of the foregoing disadvantages inherent in the known types of knot tying devices now present in the prior art, the present invention provides a new line securing assembly construction wherein the same can be utilized for assisting a lone user in securely and rapidly tying lines.

The general purpose of the present invention, which will be described subsequently in greater detail, is to provide a new line securing assembly apparatus and method which has many of the advantages of the knot tying devices mentioned heretofore and many novel features that result in a new line securing assembly which is not anticipated, rendered obvious, suggested, or even implied by any of the prior art knot tying devices, either alone or in any combination thereof.

To attain this, the present invention generally comprises a main block member which is preferably substantially rectangular and provides a fixable point for securing a line, and a plurality of notch portions positioned along an outer edge of the main block member, each of the notch portions being for receiving a line to be secured.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new line securing assembly apparatus and method which has many of the advantages of the knot tying devices mentioned heretofore and many novel features that result in a new line securing assembly which is not anticipated, rendered obvious, suggested, or even implied by any of the prior art knot tying devices, either alone or in any combination thereof.

It is another object of the present invention to provide a new line securing assembly which may be easily and efficiently manufactured and marketed.

It is a further object of the present invention to provide a new line securing assembly which is of a durable and reliable construction.

An even further object of the present invention is to provide a new line securing assembly which is susceptible of a low cost of manufacture with regard to both materials and labor, and which accordingly is then susceptible of low prices of sale to the consuming public, thereby making such line securing assembly economically available to the buying public.

Still yet another object of the present invention is to provide a new line securing assembly which provides in the apparatuses and methods of the prior art some of the advantages thereof, while simultaneously overcoming some of the disadvantages normally associated therewith.

Still another object of the present invention is to provide a new line securing assembly for assisting a lone user in securely and rapidly tying lines.

Yet another object of the present invention is to provide a new line securing assembly which includes a main block member which is preferably substantially rectangular and provides a fixable point for securing a line, and a plurality of notch portions positioned along an outer edge of the main block member, each of the notch portions being for receiving a line to be secured.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
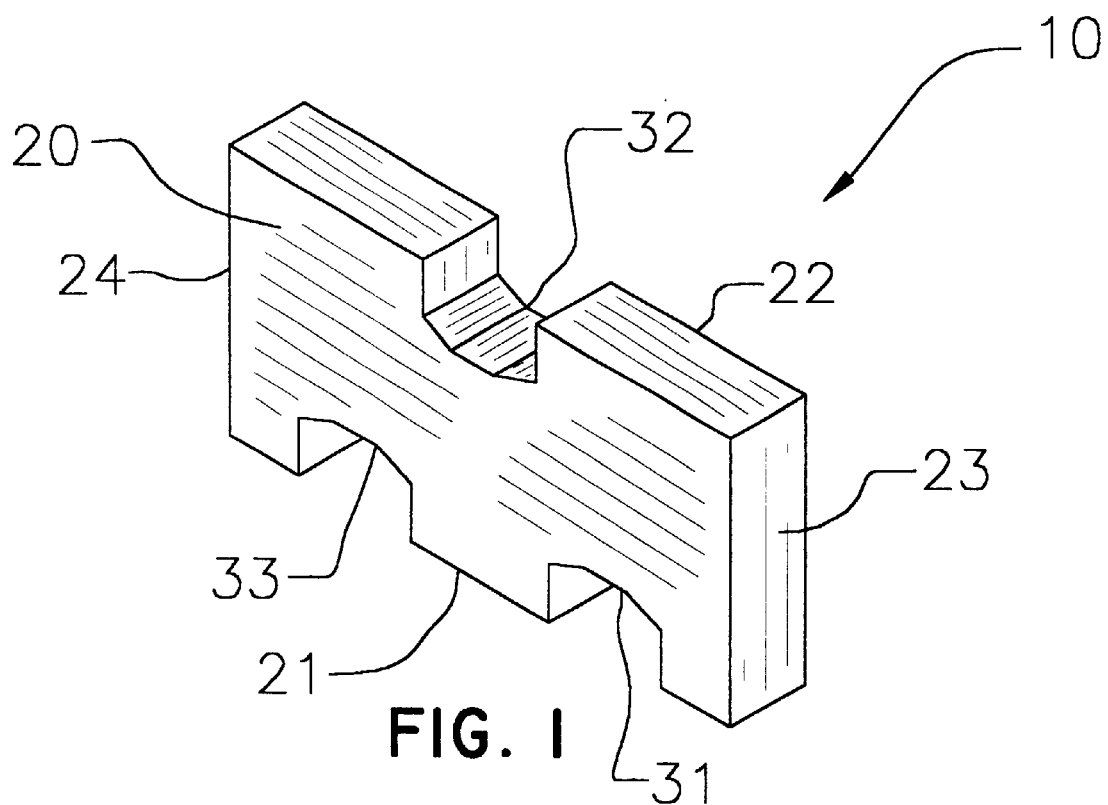
FIG. 1 is a schematic perspective view of a new line securing assembly according to the present invention.
Figure 2:
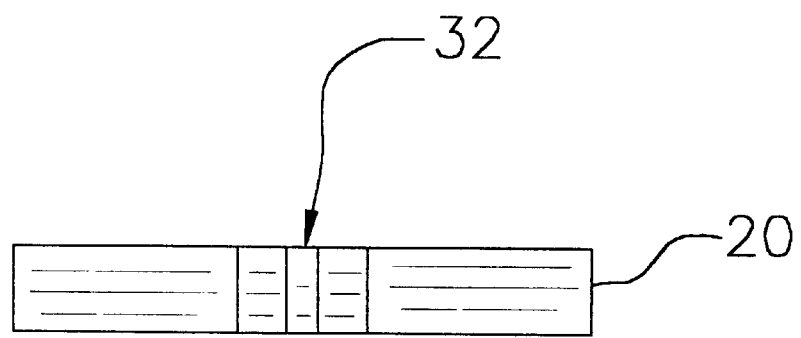
FIG. 2 is a schematic top view of the present invention.
Figure 3:
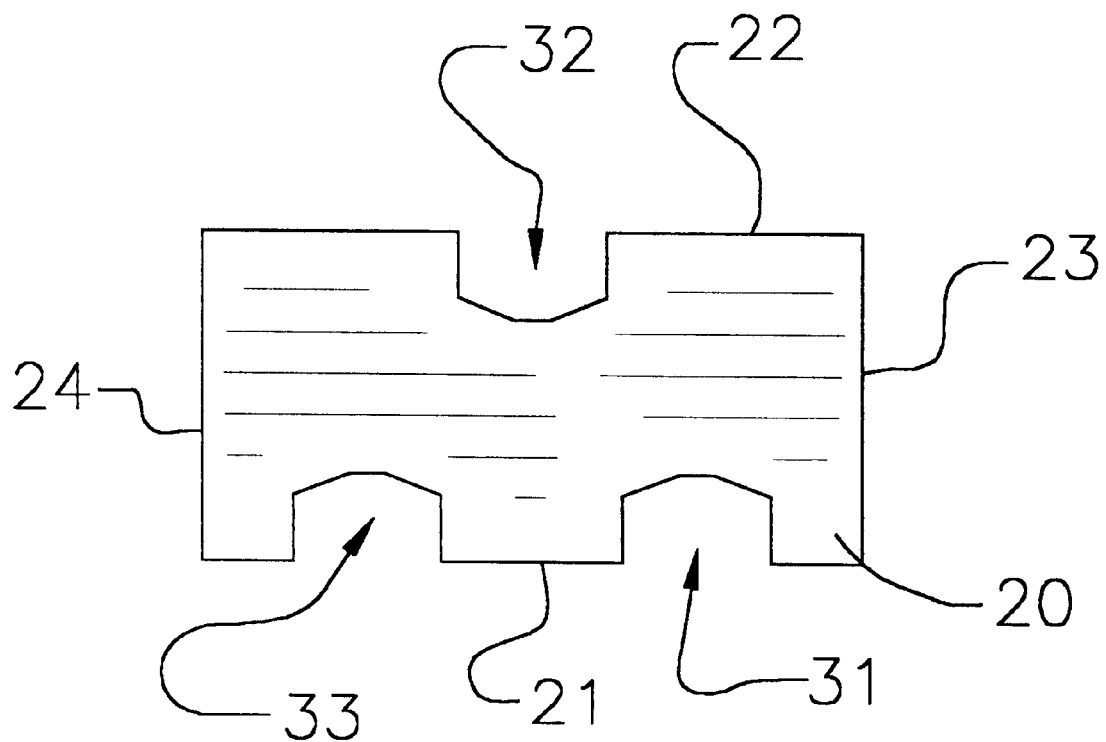
FIG. 3 is a schematic front view of the present invention.
Figure 4:
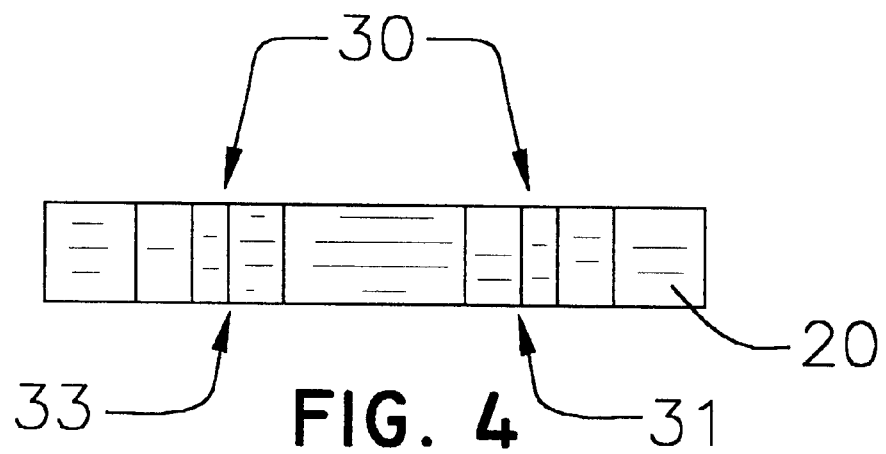
FIG. 4 is a schematic bottom view of the present invention.

With reference now to the drawings, and in particular to FIGS. 1 through 4 thereof, a new line securing assembly embodying the principles and concepts of the present invention and generally designated by the reference numeral 10 will be described.

As best illustrated in FIGS. 1 through 4, the line securing assembly 10 generally comprises a main block member 20, and a plurality of notch portions 30.

The main block member 20 is substantially rectangular. The main block member 20 provides a fixable point for securing a line.

The plurality of notch portions 30 is preferably positioned on an outer edge of the main block member 20. Each of the notch portions 30 is for receiving a line to be secured.

In an embodiment, the main block member 20 having a length of approximately two and one half inches. The block member 20 having a width of approximately one and one quarter inches. The main block member 20 having a depth of approximately three eighths of an inch.

In an embodiment the plurality of notch portions 30 comprises a first 31, second 32, and third notch portion 33.

In a further embodiment the first 31 and third notch portions 33 are positioned adjacent to a bottom edge 21 of the main block member 20. The second notch portion 32 is positioned adjacent to a top edge 22 of the main block member 20 for facilitating engaging a line to be secured.

In an embodiment the first 31 and third notch portions 33 each have a longitudinal axis. The first notch portion 31 is positioned such that the longitudinal axis is positioned approximately five eighths of an inch from a side edge 23 of the main block member 20. The third notch portion 33 is positioned such that the longitudinal axis is positioned approximately five eighths of an inch from a second side edge 24 of the main block member 20.

In still a further embodiment, the second notch portion 32 also has a longitudinal axis. The second notch portion 32 is positioned such that the longitudinal axis is positioned approximately one and one quarter inches from the side edge 23 of the main block member 20 and approximately one and one quarter inches from the second side edge 24 of the main block member 20.

In yet a further embodiment, each one of the notch portions 30 is substantially v-shaped for facilitating engaging a line to be secured.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A line securing assembly for use in conjunction with lines, ropes, and other securing elongate members comprising:

a main block member being substantially rectangular, said main block member providing a fixable point for securing a line;

a plurality of notch portions positioned on an outer edge of said main block member, each of said notch portions being for receiving a line to be secured, each notch portion having a front wall with first and second edges, a pair of tapered walls, each one of said tapered walls being coupled to said front wall along an associated one of said first and second edges, and pair of side walls, each side wall being coupled to an associated one of said pair of tapered walls, said notch portions receiving a line without compressing a diameter of the line.

2. The line securing assembly of claim 1, wherein said main block member having a length of approximately two and one half inches, said block member having a width of approximately one and one quarter inches, said main block member having a depth of approximately three eighths of an inch.

3. The line securing assembly of claim 1, wherein said plurality of notch portions comprises a first, second, and third notch portion, said second notch being positioned opposite of said first and third notches, said second notch being positioned medially between said first and third notches.

4. The line securing assembly of claim 3, wherein said first and third notch portions being positioned adjacent to a bottom edge of said main block member, said second notch portion being positioned adjacent to a top edge of said main block member for facilitating engaging a line to be secured.

5. The line securing assembly of claim 4, wherein said first and third notch portions each having a longitudinal axis, said first notch portion being positioned such that said longitudinal axis being positioned approximately five eighths of an inch from a side edge of said main block member, said third notch portion being positioned such that said longitudinal axis being positioned approximately five eighths of an inch from a second side edge of said main block member.

6. The line securing assembly of claim 4, wherein said second notch portion having a longitudinal axis, said second notch portion being positioned such that said longitudinal axis being positioned approximately one and one quarter inches from said side edge of said main block member and approximately one and one quarter inches from said second side edge of said main block member.

7. The line securing assembly of claim 1, wherein each one of said notch portions being substantially v-shaped for facilitating engaging a line to be secured.

8. A line securing assembly for use in conjunction with lines, ropes, and other securing elongate members comprising:

a main block member being substantially rectangular, said main block member providing a fixable point for securing a line;

a plurality of notch portions positioned on an outer edge of said main block member, each of said notch portions being for receiving a line to be secured, each notch portion having a front wall with first and second edges, a pair of tapered walls, each one of said tapered walls being coupled to said front wall along an associated one of said first and second edges, and pair of side walls, each side wall being coupled to an associated one of said pair of tapered walls, said notch portions receiving a line without compressing a diameter of the line;

wherein said main block member having a length of approximately two and one half inches, said block member having a width of approximately one and one quarter inches, said main block member having a depth of approximately three eighths of an inch;

wherein said plurality of notch portions comprises a first, second, and third notch portion;

wherein said first and third notch portions being positioned adjacent to a bottom edge of said main block member, said second notch portion being positioned adjacent to a top edge of said main block member for facilitating engaging a line to be secured;

wherein said first and third notch portions each having a longitudinal axis, said first notch portion being positioned such that said longitudinal axis being positioned approximately five eighths of an inch from a side edge of said main block member, said third notch portion being positioned such that said longitudinal axis being positioned approximately five eighths of an inch from a second side edge of said main block member;

wherein said second notch portion having a longitudinal axis, said second notch portion being positioned such that said longitudinal axis being positioned approximately one and one quarter inches from said side edge of said main block member and approximately one and one quarter inches from said second side edge of said main block member; and wherein each one of said notch portions-being substantially v-shaped for facilitating engaging a line to be secured.

* * * * *